(12) United States Patent
Devappa

(10) Patent No.: US 12,333,326 B2
(45) Date of Patent: Jun. 17, 2025

(54) SERVICE LEVEL OBJECTIVE BASED PRIORITY PROCESSING OF CONTROL PATH OPERATIONS

(71) Applicant: Dell Products, L.P., Hopkinton, MA (US)

(72) Inventor: Jayanth Shimoga Devappa, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 482 days.

(21) Appl. No.: 17/993,037

(22) Filed: Nov. 23, 2022

(65) Prior Publication Data

US 2024/0168788 A1   May 23, 2024

(51) Int. Cl.
*G06F 16/00* (2019.01)
*G06F 9/455* (2018.01)

(52) U.S. Cl.
CPC .. *G06F 9/45558* (2013.01); *G06F 2009/4557* (2013.01); *G06F 2009/45583* (2013.01)

(58) Field of Classification Search
CPC .................................................. G06F 9/45558
See application file for complete search history.

(56) References Cited

U.S. PATENT DOCUMENTS 9,557,921 B1 *   1/2017   Cohen ................... G06F 3/0605

* cited by examiner

*Primary Examiner* — Ajith Jacob
(74) *Attorney, Agent, or Firm* — Anderson Gorecki LLP

(57) ABSTRACT

A VASA provider is configured to include a control channel that is able to provide differentiated service to control path operations. The VASA provider maps a first set of data path service level objectives (SLOs) available on a storage system to a second set of control path SLOs. The VASA provider maintains a set of control path operation queues, such that a separate control path operation queue is maintained for each of the control path SLOs. Virtual machines are assigned control path SLOs based on their data path SLOs. Control path operations from virtual machines are mapped using the control path SLOs to the control path operation queues. The VASA provider processes control operations from the set of control path operation queues in a differentiated manner, to thereby provide different quality of service levels to the control operations of the different virtual machines.

20 Claims, 5 Drawing Sheets

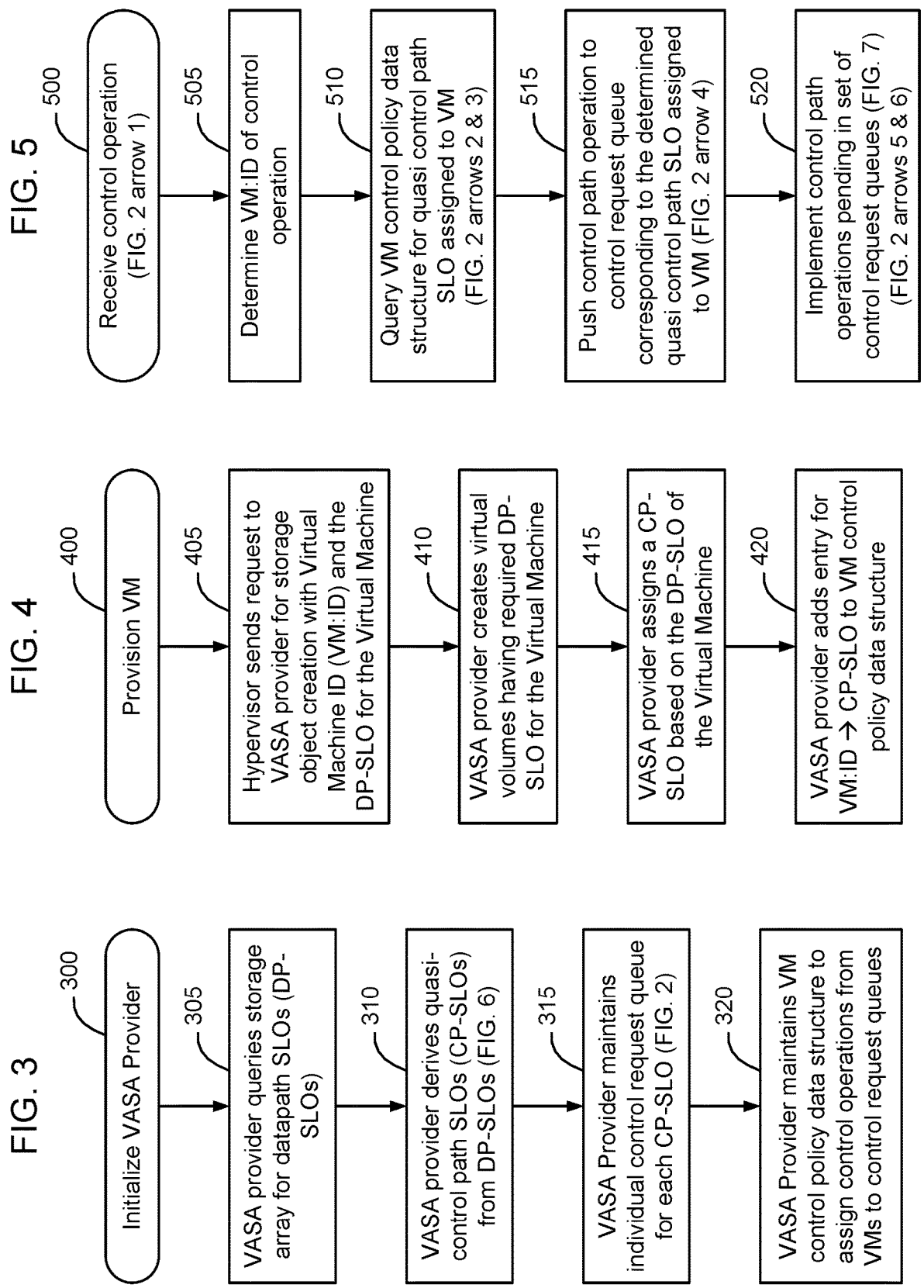

SERVICE LEVEL OBJECTIVE BASED PRIORITY PROCESSING OF CONTROL PATH OPERATIONS

FIELD

This disclosure relates to computing systems and related devices and methods, and, more particularly, to a method and apparatus for service level objective based priority processing of control path operations from virtual machines by a VASA provider.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

VMware™ virtual machines use storage objects referred to as virtual volumes. To abstract storage resources provided by a storage array, each storage array provides a Virtual Volumes storage provider, also called a VMware APIs for Storage Awareness (VASA) provider, that is used to create and maintain the virtual volumes for the virtual machines.

Virtual volume objects are encapsulations of virtual machine files, virtual disks, and their derivatives. Virtual volume objects are also referred to herein simply as "virtual volumes". Virtual volumes are created in virtual volume storage containers. Storage containers, in some embodiments, are implemented as pools of raw storage capacity or as aggregations of storage capabilities that a storage system provides to the virtual volumes.

The VASA provider manages all aspects of the virtual volumes, such that the virtual machines (ESXi hosts) have no direct access to virtual volumes on the storage side. Instead, ESXi hosts use a logical I/O proxy exposed by the VASA provider, called a protocol endpoint, to communicate with virtual volumes and the virtual disk files that the virtual volumes encapsulate.

Each virtual machine that runs on a virtual volumes datastore implemented by a VASA provider is associate with a Virtual Machine (VM) storage policy. A VM storage policy is a set of rules that contains placement and quality-of-service requirements for a virtual machine, and specify the metrics that the storage system must implement in connection with data path operations for the virtual machine. The policy enforces appropriate placement of the virtual machine within Virtual Volumes storage and guarantees that storage can satisfy virtual machine requirements. In some embodiments, the storage system advertises a set of available Service Level Objectives (SLOs) that it is able to provide, and the VM storage policies are set based on the available SLOs. When a virtual machine is provisioned, one of the SLOs advertised by the storage system is selected and used to set the VM storage policy for the virtual machine.

The VASA provider creates devices in storage resources in the storage array, which honors the requirements of the Service Level Objective (SLA) in the storage policy. Data-path firmware will offer QoS to the IO operations on the devices based on which storage resources the device is created. However, in addition to data path operations, the hosts also generate control path operations. Specifically, the VASA provider functions as a quasi-control path which not only plays a role in storage object management, but also pays a crucial role in provisioning and data services. Any latencies in processing of VASA calls or unavailability of the VASA provider can cause data unavailability.

Conventionally, when a VASA provider was servicing control operation requests from multiple virtual machines, every control operation would be scheduled without any priority. When the VASA provider was servicing quasi-control requests from multiple hosts, every request would be scheduled without any priority differentiation. Accordingly, even virtual machines that were hosting the most critical applications would not receive any priority from the VASA provider in connection with implementation of control operations. Thus, operations such as powering on, adding data storage volumes or storage space, creating snapshots, and many other quasi control operations that were dependent on the VASA provider control path were not prioritized between different virtual machines.

According to some embodiments, a VASA provider is configured to include a control channel that is able to provide differentiated service to control path operations. In some embodiments, the VASA provider maps a first set of data path service level objectives (DP-SLOs) available on a storage system to a second set of control path service level objectives (CP-SLOs). The VASA provider maintains a set of control path operation queues, such that a separate control path operation queue is maintained for each of the CP-SLOs. As virtual machines are created, the DP-SLO associated with the virtual machine, for example that is used to set the storage policy for the VM, is used to determine a corresponding CP-SLO for the virtual machine.

The VASA provider maintains a mapping between Virtual Machine ID (VM:ID) and the determined corresponding CP-SLO for the virtual machine. When a control operation is received by the VASA provider, the VASA provider uses the VM:ID to determine the CP-SLO that is associated with the Virtual Machine, and based on the determined CP-SLO enters the control operation into the control path operation queue associated with the determined CP-SLO. The VASA provider processes control operations from the set of control path operation queues in a differentiated manner, to thereby provide different quality of service levels to the control operations of the different virtual machines. In this manner, the VASA provider is able to extend the storage policies associated with data operations to also encompass the manner in which control operations are prioritized within the storage system.

Conventionally, when a VASA provider was servicing control operation requests from multiple virtual machines, every control operation would be scheduled without any priority. Accordingly, even virtual machines that were hosting the most critical applications would not receive any priority from the VASA provider in connection with implementation of control operations. Thus, operations such as powering on, adding data disk, creating snapshots, and many other quasi control operations that were dependent on the VASA provider control path were not prioritized between different virtual machines. By enabling VASA provider to prioritize particular control path operations that are associated with virtual machines with higher priority storage policies, it is possible to provide differentiated service not only to data path operations for the virtual machine, but to also provide differentiated service for the control operations as well.

BRIEF DESCRIPTION OF THE DRAWINGS

FIG. 3 is a flow chart of an example process of initializing a VASA provider that is configured to provide differentiated processing of control path operations, according to some embodiments.

FIG. 4 is a flow chart of an example process of provisioning a virtual machine in a VASA provider that is configured to provide differentiated processing of control path operations, according to some embodiments.

FIG. 5 is a flow chart of an example process of receiving a control operation on the control path of a VASA provider that is configured to provide differentiated processing of control path operations, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
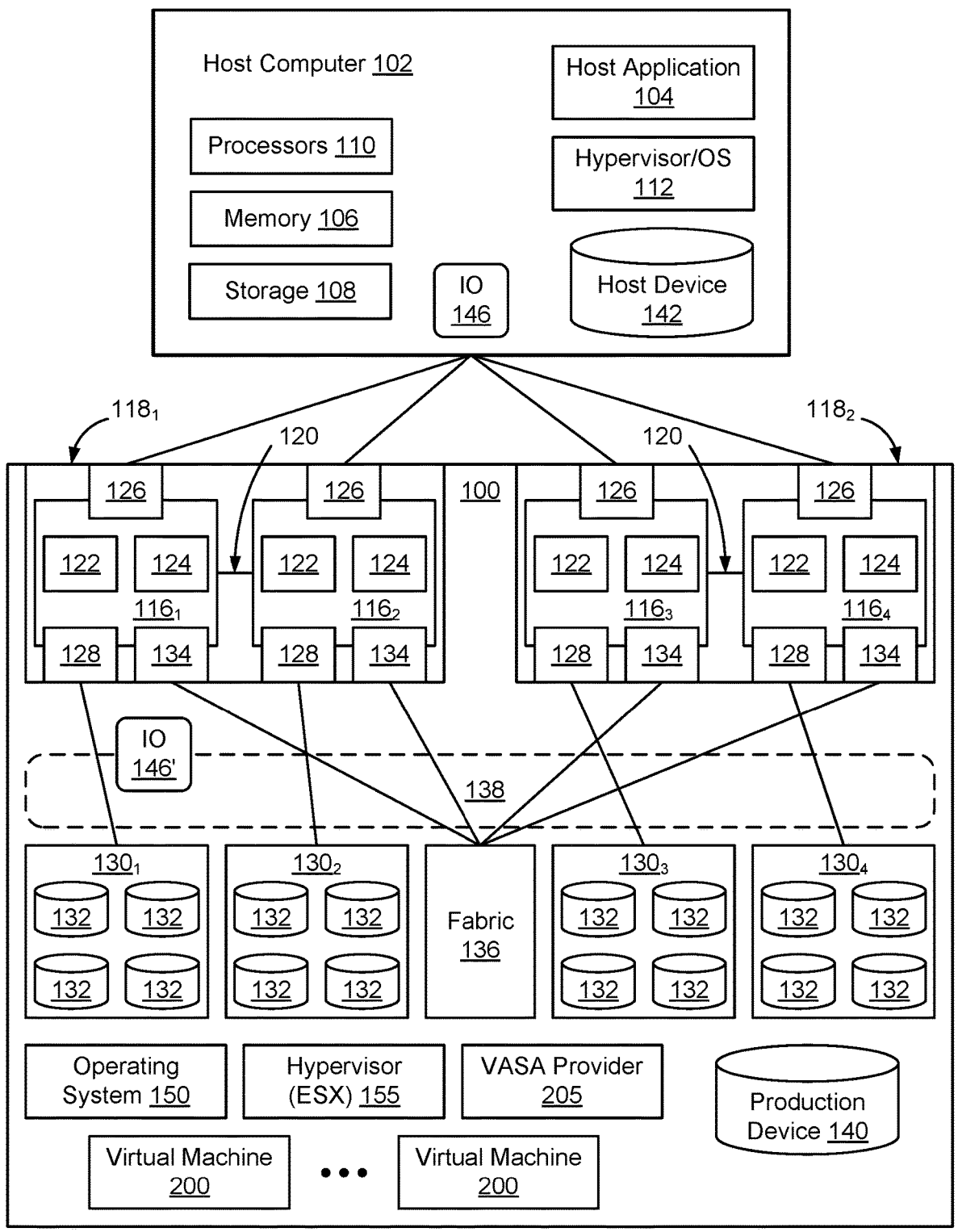
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

Host computer 102, in some embodiments, is implemented as a virtual machine. Some example virtual machines will be described herein that are implemented using VMware™, although it should be understood that it is possible to implement virtual machines using other platforms. A virtual machine has its own guest operating system, and a hypervisor 155 abstracts the hardware of the underlying computer system from the virtual machine.

VMware virtual machines use storage objects provided by the underlying storage system 100 that are referred to as virtual volumes 235. To abstract storage resources provided by a storage array 100, each storage array 100 provides a Virtual Volumes storage provider, also called a VMware APIs for Storage Awareness (VASA) provider 205, that is used to create and maintain the virtual volumes 235 for the virtual machines 200.

Virtual volume objects 235 are encapsulations of virtual machine files, virtual disks, and their derivatives. Virtual volume objects are also simply referred to herein as "virtual volumes". Virtual volumes are created in virtual volume storage containers 230. Storage containers 230, in some embodiments, are implemented as pools of raw storage capacity or as aggregations of storage capabilities that a storage system 100 provides to the virtual volumes 235. Storage containers 230 are storage objects that are created from storage resources 132, for example using a management console of the storage system 100.

The VASA provider 205 manages all aspects of the virtual volumes 235, such that the virtual machines 200 (ESXi hosts) have no direct access to virtual volumes 235 on the storage side. Instead, ESXi hosts 200 use a logical I/O proxy, called a protocol endpoint, to communicate with virtual volumes 235 and the virtual disk files that the virtual volumes 235 encapsulate.

Figure 2:
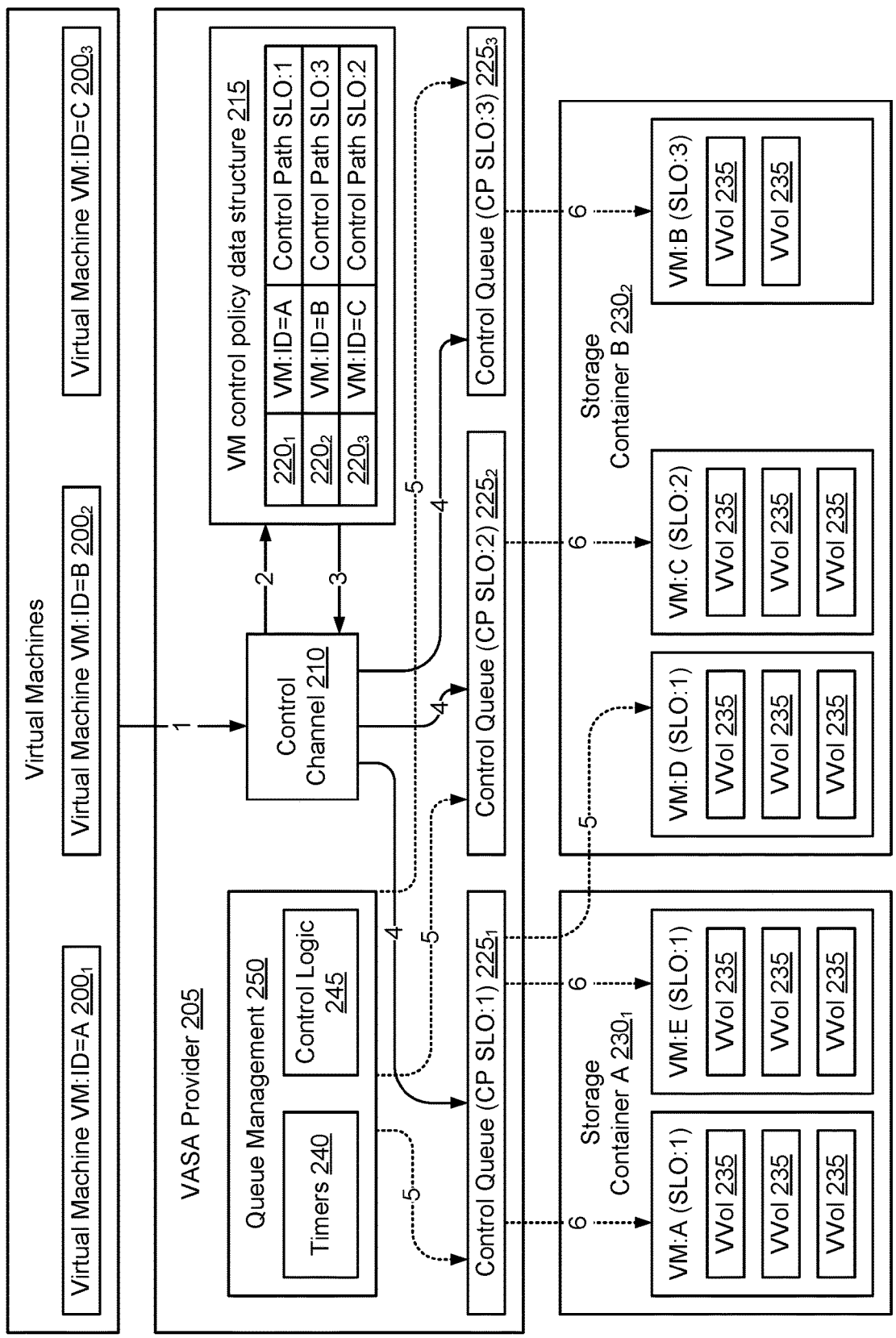
FIG. 2 is a functional block diagram of an example VASA provider that is configured to provide differentiated processing of control path operations showing aspects of a control path of the VASA provider in greater detail, according to some embodiments.

FIG. 2 is a functional block diagram of an example VASA provider that is configured to provide differentiated processing of control path operations showing aspects of a control path of the VASA provider in greater detail, according to some embodiments. As shown in FIG. 2, virtual machines $200_1$, $200_2$, $200_3$, interact with a VASA provider to obtain access to virtual volumes 235. Although FIG. 2 shows only a small number of virtual machines 200 interacting with a VASA provider, in some embodiments a given VASA provider may host thousands of virtual machines 200.

Each virtual machine that runs on a virtual volumes datastore implemented by a VASA provider is associated with a Virtual Machine (VM) storage policy. A VM storage policy is a set of rules that contains placement and quality-of-service requirements for a virtual machine, and specify the metrics that the storage system must implement in connection with data path operations for the virtual machine. The policy enforces appropriate placement of the virtual machine within Virtual Volumes storage and guarantees that storage can satisfy virtual machine requirements. In some embodiments, the storage system advertises a set of available Service Level Objectives (SLOs) that it is able to provide, and the VM storage policies are set based on the available SLOs. When a virtual machine is provisioned, one of the SLOs advertised by the storage system is selected and used to set the VM storage policy for the virtual machine. The service level objectives might specify, for example, a range of response times that the storage system will provide when responding to IO operations, or other measurable quantities.

Storage volumes 235 are created by a VASA provider 205 from storage containers 230. In FIG. 2, two storage containers 230—storage container A $230_1$, and storage container B $230_2$ have been created, which are storage objects that are created from storage resources, for example, using a management console of the storage array. The VASA provider reads the available storage containers and presents it to ESX hosts where it can create Virtual Machines. For example, in FIG. 2 three virtual machines have been created: Virtual machine A with Virtual Machine Identifier (VM:ID=A) that has a storage policy SLO:1, virtual machine B with Virtual Machine Identifier (VM:ID=B) that has a storage policy SLO:3, and virtual machine C with Virtual Machine Identifier (VM:ID=C) that has a storage policy SLO:2. These service Level Objectives (SLO) specify different quality of service levels that are to be provided to each of the respective virtual machines. A set of virtual volumes 235 is created for each of the virtual machines within one of the storage containers 230, and all data operations (IO operations) from the virtual machine are implemented on the virtual volumes 230 that are created for the respective virtual machine 200. By specifying the storage policy for each virtual machine 200, the VASA provider 205 is able to create devices for the virtual machine in storage resources which guarantees the data path quality of service. Based on the storage resources used to create the devices, the storage array firmware is able to provide differentiated service on the data path for each of the virtual machines 200 in connection with implementing data operations on the virtual volumes 235.

Conventionally, when a VASA provider 205 was servicing control operation requests from multiple virtual machines, every control operation would be scheduled without any priority. Accordingly, even virtual machines that were hosting the most critical applications would not receive any priority from the VASA provider 205 in connection with implementation of control operations. Thus, operations such as powering on, adding data storage volumes or storage space, creating snapshots of storage volumes, and many other quasi control operations that were dependent on the VASA provider control path were not prioritized between different virtual machines 200.

Figure 6:
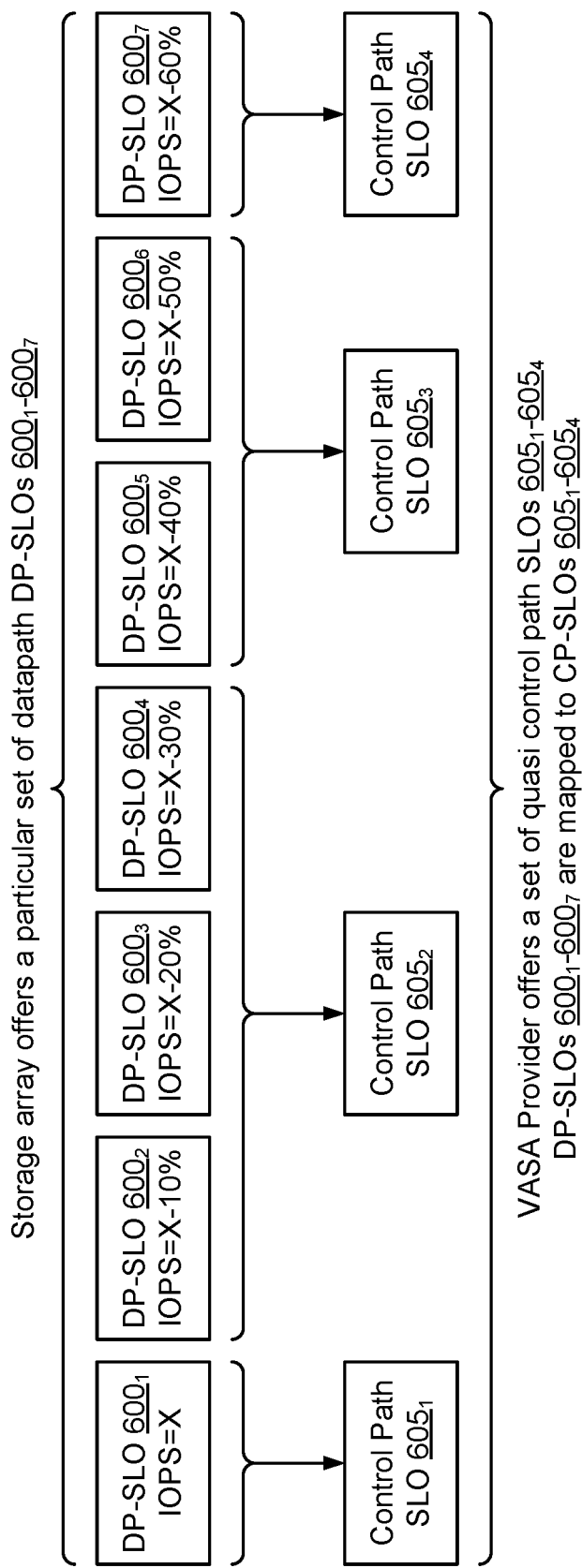
FIG. 6 is a functional block diagram of an example mapping of data path service level objectives to control path service level objectives provided by a VASA provider that is configured to provide differentiated processing of control path operations, according to some embodiments.

According to some embodiments, a VASA provider 205 is configured to include a control channel 210 that is able to provide differentiated service to control path operations received from different virtual machines 200. In some embodiments, the VASA provider 205 maps a first set of data path service level objectives (DP-SLOs) available on a storage system 100 to a second set of control path service level objectives (CP-SLOs). An example mapping between DP-SLOs and CP-SLOs is shown in FIG. 6. The VASA provider 205 maintains a set of control path operation queues 225, such that a separate control path operation queue 225 is maintained for each of the CP-SLOs. As virtual machines 200 are created, the DP-SLO associated with the virtual machine 200, for example that is used to set the storage policy for the VM, is used to determine a corresponding CP-SLO for the virtual machine 200.

Figure 7:
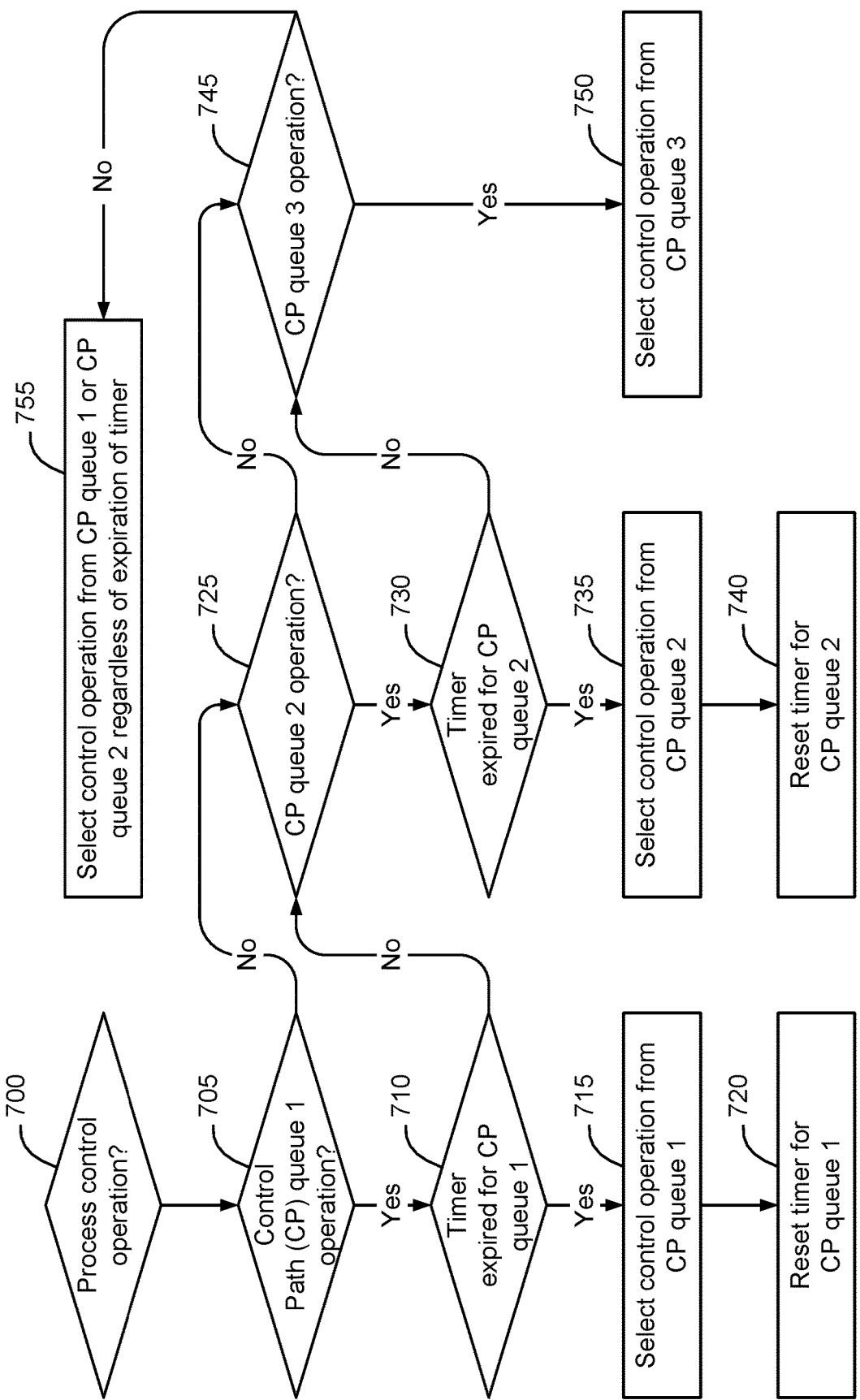
FIG. 7 is a flow chart of an example process of selecting a control operation from a set of control operation queues in a VASA provider configured to provide differentiated processing of control path operations, according to some embodiments

The VASA provider 205 maintains a virtual machine control policy data structure 215 that maintains a mapping between Virtual Machine ID (VM:ID) and the determined corresponding CP-SLO for the virtual machine 200. When a control operation is received by the VASA provider, the VASA provider uses the VM:ID to determine the CP-SLO that is associated with the virtual machine 200, and based on the determined CP-SLO enters the control operation into the control path operation queue 225 associated with the determined CP-SLO. The VASA provider 205 processes control operations from the set of control path operation queues in a differentiated manner, to thereby provide different quality of service levels to the control operations of the different virtual machines 200. An example way of providing differentiated processing is shown in FIG. 7. In this manner, the VASA provider 205 is able to extend the storage policies associated with data operations to also encompass the manner in which control operations are implemented, to enable higher priority control operations to be prioritized for completion within the VASA provider 205.

By enabling VASA provider to prioritize particular control path operations that are associated with virtual machines with higher priority storage policies, it is possible to provide differentiated service not only to data path operations for the virtual machine, but to also provide differentiated service for the control operations as well.

FIG. 2 includes arrows 1 through 6 that help illustrate a process of providing differentiated service to a control operation by a VASA provider. In FIG. 2, it is assumed that virtual machines A, B, and C have been created on the VASA provider and that different storage policies have been assigned to each of the virtual machines. As shown in FIG. 2, in some embodiments the control channel 210 maintains a virtual machine control policy data structure 215 containing entries $220_1$, $220_2$, $220_3$, correlating the virtual machine ID (VM:ID=A, VM:ID=B, VM:ID=C) with corresponding control path service level objectives (CP-SLO:1, CP-SLO:3, CP-SLO:2) of the virtual machines $200_1$, $200_2$, $200_3$.

When a control operation is received (FIG. 2, arrow 1), the control operation is received on the control channel 210 of the VASA provider 205. The control channel 210 determines the identity of the virtual machine (VM:ID) that submitted the control operation on the control channel 210, and uses the VM:ID to determine the CP-SLO of the virtual machine from the corresponding entry for the virtual machine 200 in the VM control policy data structure 215 (FIG. 2, arrow 2). The CP-SLO is returned from the VM control policy data structure 215 (FIG. 2, arrow 3). Based on the CP-SLO, the control channel 210 causes the control operation to be placed in one of the control queues 225 that corresponds to the determined CP-SLO (FIG. 2, arrow 4).

A queue management system 250 manages control queues 225, and selects control operations for processing from the control queues 225 in a differentiated manner. Specifically, as shown in FIG. 2, in some embodiments the queue management system 250 periodically selects a control operation for processing by the VASA provider (FIG. 2, arrow 5). The control operation is then processed by the VASA provider (FIG. 2, arrow 6) to implement the operation on the storage resources of the storage system 100.

There are several ways that the queue management system 250 may use the control queues 225 to provide differentiated service to the control operations of the virtual machines. In some embodiments, the queue management system 250 processes all control operations from the control queue $225_1$ associated with the highest control path service level objective (CP-SLO:1) before processing any control operations from any of the other control queues $225_2$, $225_3$, then processes all control operations from the control queue $225_2$ associated with the next highest control path service level objective (CP-SLO:2) before processing any control operations from any of the other control queues $225_3$.

In other embodiments, the queue management system 250 processes different numbers of control operations from each of the control queues $225_1$, $225_2$, and $225_3$, during a given time interval. For example, in some embodiments the queue management system might be configured such that, during each given time interval, the queue management system 250 selects 3 control operations for processing from the control queue $225_1$ having CP-SLO:1, selects two control operations for processing from the control queue $225_2$ having CP-SLO: 2, and selects one control operation for processing from the control queue $225_3$ having CP-SLO:3.

In other embodiments, for example as shown in FIG. 7, the queue management system 250 maintains a set of timers 240 for each of the control queues, and control logic 245 is used to select control operations from each of the control queues 225 using the timers 240.

FIG. 3 is a flow chart of an example process of initializing a VASA provider that is configured to provide differentiated processing of control path operations, according to some embodiments. As shown in FIG. 3, in some embodiments when a VASA provider is initialized (block 300) the VASA provider 205 queries the storage array for a set of data path service level objectives (DP-SLOs) provided by the storage array 100 (block 305). Different storage arrays might provide different data path service level objectives. For example, a first storage array might offer six data path SLOs whereas a second storage array might offer eight data path SLOs. In some embodiments, the VASA provider has a fixed number of control operation queues 225 and, accordingly, the VASA provider 205 derives quasi-control path SLOs (CP-SLOs) from the set of data path SLOs (block 310).

FIG. 6 shows an example way of deriving quasi-control path SLOs (CP-SLOs) from the set of data path SLOs (block 310). For example, as shown in FIG. 6, in some embodiments the VASA provider 205 maintains a set of control queues 225, in which each control queue is used to hold control operations that are to be provided a particular control path SLO. The storage system 100, by contrast, may provide a larger number of data path SLOs. In some embodiments, the queue management system 250 maps the data path SLOs to the control path SLOs. For example, in FIG. 6, the storage system is able to offer seven DP-SLOs, whereas the VASA provider 205 has four control path queues corresponding to four CP-SLOs. In the example shown in FIG. 6, DP-SLO $600_1$ is mapped to CP-SLO $605_1$, DP-SLO $600_2$, $600_3$, and $600_4$, are mapped to CP-SLO $605_2$, DP-SLO $600_5$ and $600_6$ are mapped to CP-SLO $605_3$, and DP-SLO $600_7$ is mapped to CP-SLO 6054. Other mappings may be implemented depending on the embodiment.

Using this DP-SLO to CP-SLO mapping, any time a virtual machine is assigned a data path SLO, the queue management system 250 is able to map the data path SLO to one of the control path SLOs supported by the VASA provider 205, such that control operations from virtual machines 200 are able to be slotted to the correct control queue 225 for differentiated prioritization by the VASA provider 205. Specifically, as shown in FIG. 3, in some embodiments the VASA provider 205 maintains individual control request queues 225 for each CP-SLO (block 315). The VASA provider 205 also maintains a VM control policy data structure 215 that is used by the VASA provider 205 to implement lookup operations for control operations received from particular virtual machines 200, to assign the control operations from the virtual machines 200 to the control request queues 225 (block 320).

FIG. 4 is a flow chart of an example process of provisioning a virtual machine in a VASA provider that is configured to provide differentiated processing of control path operations, according to some embodiments. As shown in FIG. 4, when a virtual machine is provisioned on a VASA provider 205 (block 400), the hypervisor sends a request to the VASA provider 205 for storage object creation with the virtual machine ID (VM:ID) and the data path service level objective (DP-SLO) for the virtual machine 200 (block 405).

The VASA provider 205 creates the requested storage objects (virtual volumes 235) having the required data path SLO for the virtual machine 200 (block 410). The VASA provider 205 also assigns a control path service level objective (CP-SLO) to the virtual machine 200 based on the mapping described in connection with FIG. 6 (block 415). The VASA provider 205 also adds an entry 220 for the virtual machine 200 correlating the VM:ID with the assigned CP-SLO to the VM control policy data structure 215 (block 420).

FIG. 5 is a flow chart of an example process of receiving a control operation on the control path 210 of a VASA provider 205 that is configured to provide differentiated processing of control path operations, according to some embodiments. As shown in FIG. 5, when a control operation is received by the VASA provider 205 (block 500), in some embodiments the VASA provider 205 determines the VM:ID of the virtual machine 200 that issued the control operation (block 505). The control channel 210 then queries the virtual machine control policy data structure 215 using the VM:ID, to determine the CP-SLO to be used to implement the control operation (block 510). Based on the determined CP-SLO, the control operation is pushed to the control queue 225 configured to be used to store control operations having the determined CP-SLO (block 515).

The queue management system 250 then selects control operations for processing from the set of control queues 225 (block 520) to provide differential quality of service levels to the control operations according to the assigned CP-SLOs.

FIG. 7 shows an example process of providing SLO based priority processing of control path operations using a set of control queues and a set of timers, according to some embodiments. It should be understood that other ways of providing SLO based priority processing may be used as well, and the example shown in FIG. 7 is merely one possible method.

As shown in FIG. 7, in some embodiments the control logic 245 periodically implements a selection process to select a control operation for processing from the set of control queues $225_1$, $225_2$, and $225_3$. By using timers of different lengths, (e.g., shorter timers for higher priority control queues) it is possible to provide differential processing of control operations to preferentially select control operations for processing from the control queue associated with higher control path service level objectives over control queues associated with lower control path service level objectives.

As shown in FIG. 7, when a determination is made that a control operation should be selected (block 700), the queue management system 250 determines if the control queue $225_1$ for the highest control path service level objective contains a pending control operations (block 705). If the control queue $225_1$ for the highest control path service level objective contains one or more pending control operations (a determination of YES at block 705), the queue management system 250 determines if the timer 240 has expired for control queue $225_1$ (block 710). If the timer has expired for control queue $225_1$ (a determination of YES at block 710), a control operation is selected for processing from control queue $225_1$ (block 715). The timer is then reset for control queue $225_1$ (block 720) and the process ends. In some embodiments, if control operations contained in control queue $225_1$ are always selected for processing, the timer for control queue $225_1$ may be set to a very low time limit or zero seconds. Using a timer to delay selection of subsequent control operations from the control queue $225_1$ prevents the control queue $225_1$ from starving other control queues $225_2$, $225_3$.

If there are no control operations in control queue $225_1$ (a determination of NO at block 705) or if the timer for control queue $225_1$ has not expired (a determination of NO at block 710), the queue management system 250 determines if the control queue $225_2$ for the next highest control path service level objective contains a pending control operations (block 725). If the control queue $225_2$ for the next highest control path service level objective contains one or more pending control operations (a determination of YES at block 725), the queue management system 250 determines if the timer 240 has expired for control queue $225_2$ (block 730). If the timer has expired for control queue $225_2$ (a determination of YES at block 730), a control operation is selected for processing from control queue $225_2$ (block 735). The timer is then reset for control queue $225_2$ (block 740) and the process ends.

If there are no control operations in control queue $225_2$ (a determination of NO at block 725) or if the timer for control queue $225_2$ has not expired (a determination of NO at block 730), the queue management system 250 determines if the control queue $225_3$ for the next highest control path service level objective contains a pending control operations (block 745). If the control queue $225_3$ for the next highest control path service level objective contains one or more pending control operations (a determination of YES at block 745) a control operation is selected for processing from control queue $225_3$ (block 750) and the process ends. If there are no control operations in control queue $225_3$, in some embodiments the queue management system selects a control operation from control queue $225_1$ or control queue $225_2$ regardless of the state of the timers 240 for those queues (block 755). Although FIG. 7 shows some embodiments in which control operations are selected from a set of three control queues $225_1$, $225_2$, $225_3$, it should be understood that the process shown in FIG. 7 can be extended to an arbitrary number of two or more control queues. By using timers of different lengths (e.g., shorter timers 240 for higher priority control queues), it is possible to prioritize control operations that are placed in higher priority control queues without starving the lower priority control queues. Using the process shown in FIG. 7, or another process of prioritizing selection of control operation, it is possible for a VASA provider to provide differentiated processing of control path operations.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A system for providing service level objective based priority processing of control path operations from virtual machines by a VMware APIs for Storage Awareness (VASA) provider, comprising:
one or more computers and one or more storage devices storing instructions that are operable, when executed by the one or more computers, to cause the one or more computers to perform operations comprising:
creating virtual volumes on storage resources of a storage system, by the VASA provider, for a set of Virtual Machines (VMs), each VM having a VM storage policy based on a set of available data path Service Level Objectives (SLOs) advertised by the storage system;
mapping the set of available data path SLOs advertised by the storage system to a set of control path SLOs implemented by the VASA provider, each control path SLO being associated with a separate control path operation queue in the VASA provider
assigning a respective control path SLO to each virtual machine based on the respective VM storage policy for the VM and the mapping;
receiving control path operations from the VMs;

using the control path SLOs assigned to the VMs to place the control path operations from the VMs into respective control path operation queues; and selecting control path operations from the control path operation queues for processing in a differentiated manner by the VASA provider, to provide differentiated quality of service to control path operations placed in the different control path operation queues.

2. The system of claim 1, wherein each VM storage policy specifies a respective service level objective to be achieved by the storage system in connection with processing data path operations for the virtual machine.

3. The system of claim 1, wherein selecting control path operations from the control path operation queues for processing in a differentiated manner comprises:

maintaining a respective timer for each control path queue, each timer having a different length; and selecting a control path operation from a given control path queue only after the respective timer for the given control path queue has expired.

4. The system of claim 3, wherein the timer for a highest priority control path queue has a duration of zero seconds.

5. The system of claim 1, wherein the set of available data path SLOs advertised by the storage system is larger than the set of control path SLOs implemented by the VASA provider.

6. The system of claim 5, wherein the set of control path SLOs includes at least two control path SLOs and wherein the control path operation queues include at least two separate control path operation queues.

7. The system of claim 1, wherein assigning a respective control path SLO to each virtual machine based on the respective VM storage policy for the VM and the mapping comprises maintaining a control policy data structure having a plurality of entries, each entry correlating a respective virtual machine IDs with a respective control path SLO.

8. The system of claim 1, wherein the control path operations include creating and modifying storage objects in storage resources of the storage system for use by the virtual machines.

9. The system of claim 1, wherein selecting control path operations from the control path operation queues for processing comprises:

determining if a highest priority control path operation queue contains any control path operations to be processed;

in response to a determination that the highest priority control path operation queue contains a control path operation to be processed, determining if a timer for the highest priority control path operation queue has achieved a first value;

in response to a determination that the timer for the highest priority control path operation queue has achieved the first value, selecting one of the control path operations from the highest priority control path operation queue to be processed; and in response to a determination that the highest priority control path operation queue does not contain any control path operations to be processed, or in response to a determination that the timer for the highest priority control path operation queue has not achieved the first value, selecting a control path operation from a lower-priority control path operation queue to be processed.

10. The system of claim 9, wherein selecting the control path operation from the lower-priority control path operation queue to be processed comprises:

determining if a second-highest priority control path operation queue contains any control path operations to be processed;

in response to a determination that the second-highest priority control path operation queue contains a control path operation to be processed, determining if a timer for the second-highest priority control path operation queue has achieved a second value;

in response to a determination that the timer for the second-highest priority control path operation queue has achieved the second value, selecting one of the control path operations from the second-highest priority control path operation queue to be processed; and in response to a determination that the second-highest priority control path operation queue does not contain any control path operations to be processed, or in response to a determination that the timer for the second-highest priority control path operation queue has not achieved the second value, selecting a control path operation from a third-highest priority control path operation queue to be processed.

11. A method for providing service level objective based priority processing of control path operations from virtual machines by a VMware APIs for Storage Awareness (VASA) provider, comprising:

creating virtual volumes on storage resources of a storage system, by the VASA provider, for a set of Virtual Machines (VMs), each VM having a VM storage policy based on a set of available data path Service Level Objectives (SLOs) advertised by the storage system;

mapping the set of available data path SLOs advertised by the storage system to a set of control path SLOs implemented by the VASA provider, each control path SLO being associated with a separate control path operation queue in the VASA provider assigning a respective control path SLO to each virtual machine based on the respective VM storage policy for the VM and the mapping;

receiving control path operations from the VMs;

using the control path SLOs assigned to the VMs to place the control path operations from the VMs into respective control path operation queues; and selecting control path operations from the control path operation queues for processing in a differentiated manner by the VASA provider, to provide differentiated quality of service to control path operations placed in the different control path operation queues.

12. The method of claim 11, wherein each VM storage policy specifies a respective service level objective to be achieved by the storage system in connection with processing data path operations for the virtual machine.

13. The method of claim 11, wherein selecting control path operations from the control path operation queues for processing in a differentiated manner comprises:

maintaining a respective timer for each control path queue, each timer having a different length; and selecting a control path operation from a given control path queue only after the respective timer for the given control path queue has expired.

14. The method of claim 13, wherein the timer for a highest priority control path queue has a duration of zero seconds.

15. The method of claim 11, wherein the set of available data path SLOs advertised by the storage system is larger than the set of control path SLOs implemented by the VASA provider.

16. The method of claim 15, wherein the set of control path SLOs includes at least two control path SLOs and wherein the control path operation queues include at least two separate control path operation queues.

17. The method of claim 11, wherein assigning a respective control path SLO to each virtual machine based on the respective VM storage policy for the VM and the mapping comprises maintaining a control policy data structure having a plurality of entries, each entry correlating a respective virtual machine IDs with a respective control path SLO.

18. The method of claim 11, wherein the control path operations include creating and modifying storage objects in storage resources of the storage system for use by the virtual machines.

19. The method of claim 11, wherein selecting control path operations from the control path operation queues for processing comprises:

determining if a highest priority control path operation queue contains any control path operations to be processed;

in response to a determination that the highest priority control path operation queue contains a control path operation to be processed, determining if a timer for the highest priority control path operation queue has achieved a first value;

in response to a determination that the timer for the highest priority control path operation queue has achieved the first value, selecting one of the control path operations from the highest priority control path operation queue to be processed; and in response to a determination that the highest priority control path operation queue does not contain any control path operations to be processed, or in response to a determination that the timer for the highest priority control path operation queue has not achieved the first value, selecting a control path operation from a lower-priority control path operation queue to be processed.

20. The method of claim 19, wherein selecting the control path operation from the lower-priority control path operation queue to be processed comprises:

determining if a second-highest priority control path operation queue contains any control path operations to be processed;

in response to a determination that the second-highest priority control path operation queue contains a control path operation to be processed, determining if a timer for the second-highest priority control path operation queue has achieved a second value;

in response to a determination that the timer for the second-highest priority control path operation queue has achieved the second value, selecting one of the control path operations from the second-highest priority control path operation queue to be processed; and in response to a determination that the second-highest priority control path operation queue does not contain any control path operations to be processed, or in response to a determination that the timer for the second-highest priority control path operation queue has not achieved the second value, selecting a control path operation from a third-highest priority control path operation queue to be processed.

* * * * *